(12) United States Patent
Cain et al.

(10) Patent No.: US 6,787,794 B2
(45) Date of Patent: Sep. 7, 2004

(54) QUANTUM COMPUTER

(75) Inventors: Paul Cain, Cambridge (GB); Andrew Ferguson, Cambridge (GB); David Williams, Cambridge (GB)

(73) Assignee: Hitachi, Ltd., Tokyo (JP)

( * ) Notice: Subject to any disclaimer, the term of this patent is extended or adjusted under 35 U.S.C. 154(b) by 227 days.

(21) Appl. No.: 10/011,732

(22) Filed: Dec. 11, 2001

(65) Prior Publication Data

US 2003/0040168 A1 Feb. 27, 2003

(30) Foreign Application Priority Data

Aug. 13, 2001 (EP) .............................................. 01306870

(51) Int. Cl.$^7$ .......................... H01L 29/15; H01L 49/00
(52) U.S. Cl. .............................. 257/20; 257/27; 257/40; 438/99
(58) Field of Search .............................. 257/20, 27, 40; 438/99

(56) References Cited

U.S. PATENT DOCUMENTS

| 6,218,832 | B1 | * | 4/2001 | Chuang et al. | ............. | 324/300 |
| 6,369,404 | B1 | * | 4/2002 | Kane | ........................... | 257/14 |
| 6,437,413 | B1 | * | 8/2002 | Yamaguchi et al. | ........ | 257/421 |
| 6,472,705 | B1 | * | 10/2002 | Bethune et al. | ............. | 257/314 |

FOREIGN PATENT DOCUMENTS

EP 0591595 4/1994
WO WO 01/84714 A2 * 11/2001 .......... H03K/19/00

OTHER PUBLICATIONS

S. Park, et al "endo–Fullerene and Doped Diamond Nanocrystallite–Based Models of Qubits for Solid–State Quantum Computers", Journal of Nanoscience and Nanotechnology, Mar. 2001, American Scientific Publishers, U.S.A., vol. 1, No. 1, pp. 75–81.

J. Rink, "Quaentchen Fuer Quaentche Fortschritte in Der Quanteninformations–Verabeitung", CT Magazin Fuer Computer Technik, Verlag Heinz Heise GMBH, Hannover, DE No. 16, Aug. 3, 1998, pp. 150–154.

D. Srivastava et al, "Comutational Nanotechnology with Carbon Nanotubes and Fullerenes", Computing in Science & Engineering, Jul.–Aug., 2001, IEEE Comput. Soc, USA, vol. 3, No. 4, pp. 42–55.

M. Waiblinger et al, "Thermal Stability of the Endohedral Fullerenes NaC/sub 60/, NaC/sub 70/, and PaC/sub 60/", Physical Review B (Condensed Matter), Jan. 15, 2001, APS Through AIP < USA, vol. 63, No. 4, pp. 1–5.

* cited by examiner

*Primary Examiner*—Jerome Jackson
(74) *Attorney, Agent, or Firm*—Antonelli, Terry, Stout & Kraus, LLP

(57) ABSTRACT

A quantum computer comprises a pair of qubits disposed between first and second single-electron electrometers and a control gate. The qubits each comprise a molecule of ammonia caged inside a $C_{60}$ molecule disposed on a substrate. The ammonia-bearing $C_{60}$ molecule is positioned using a scanning probe microscope.

45 Claims, 10 Drawing Sheets

QUANTUM COMPUTER

FIELD OF THE INVENTION

The present invention relates to a quantum computer.

BACKGROUND ART

Quantum computation involves manipulation of data in the form of quantum bits or "qubits". Whereas in classical computation a bit of information is used to represent only one of two possible logical states, namely "1" or "0", in quantum computation, a qubit can represent both logical states simultaneously as a superposition of quantum states. This property gives rise to powerful computational parallelism. Algorithms which exploit this parallelism have been developed, for example for efficiently factorising large integers. An overview of quantum computation is found "Quantum Computation" by David Deutsh and Artur Ekert in Physics World, pp. 47–52, March 1998 and in "Quantum Computation: An Introduction" by Adriano Barenco, pp. 143–183 of "Introduction to Quantum Computation and Information" ed. Hoi-Kwong Lo, Tim Spiller and Sandu Popescu (World Scientific Publishing, 1998).

In a classical computer, a bit of information is usually represented by a voltage level. Therefore, "0" can be represented by a relatively low voltage level, say 0 volts, and "1" can be characterised by a relatively high voltage level, say 5 volts.

In a quantum computer, a qubit can be represented in a number of ways, for example using left and right polarisation states of a photon, spin-up and spin-down states of an electron and ground and excited states of quantum dot. The qubit is defined by a basis consisting of two states, which are denoted $|0>$ and $|1>$. Thus, the state of the qubit can be represented as:

$$|\psi>=a|0>+b|1> \qquad (1)$$

where a and b are complex number coefficients. The qubit stores information as a combination of 0 and 1 using different values of a and b. However, a measurement of the qubit will cause it to project onto the $|0>$ or $|1>$ state and return the result 0 or 1 accordingly. The probabilities of returning these values are $|a|^2$ and $|b|^2$ respectively. In this way, the system comprised of one qubit can store two binary values, 0 and 1, at the same time, although recovery of any stored information is restricted.

A system comprised of two qubits can store up to four binary values simultaneously as a result of superposition. Therefore, a system comprising a pair of qubits, labelled A and B, is defined by a basis of four states which can be written as $|0>_A|0>_B$, $|0>_A|1>_B$, $|1>_A|0>_B$ and $|1>_A|1>_B$. In the same way that a single qubit can store information as superposition of $|0>$ and $|1>$, a pair of qubits can store information as superposition of basis states $|0>_A|0>_B$, $|0>_A|1>_B$, $|1>_A|0>_B$ and $|1>_A|1>_B$. For example, the two qubits may be prepared such that:

$$|\psi>_{AB}=2^{-1/2}(|0>_A|0>_B+|0>_A|1>_B+|1>_A|0>_B+|1>_A|1>_B) \qquad (2)$$

Thus, four binary values 00, 01, 10 and 11 are encoded simultaneously. In this case, the two qubits exist independently of one another, such that the result of a measurement qubit A is independent of the result of a measurement of qubit B.

However, if the two qubits are entangled, then the two measurements will become correlated. Entanglement allows qubits to be prepared such that:

$$|\psi>_{AB}=2^{-1/2}(|0>_A|0>_B+|1>_A|1>_B) \qquad (3)$$

Thus, binary values 00 and 11 are encoded simultaneously. However, if qubit A is measured and a result 0 is returned, then the outcome of a subsequent measurement of qubit B will, with certainty, also be 0.

A system comprised of three qubits is defined by basis of eight states which can store eight binary numbers, 000, 001, . . . , 111 simultaneously.

In general, a system of m qubits has a basis of $2^m$ states and can be used to represent numbers from 0 to $2^m-1$. Thus, a quantum computer has a clear advantage over its classical counterpart in that it that it can store $2^m$ numbers simultaneously, whereas a classical computer with an m-bit input register can only store one of these numbers at a time.

It is the ability to store many numbers simultaneously using superposition of quantum states which makes quantum parallel processing possible. Using a single computational step it is possible to perform the same mathematical operation on $2^m$ different numbers at the same time and produce a superposition of corresponding output states. To achieve the same result in a classical computer, the computational step would need to be repeated $2^m$ times or require $2^m$ different processors.

Despite the power of quantum parallel processing, there is a drawback that only one state can be measured. However, some processes, such as sorting or searching of a database, may require only a single-valued solution. Thus, a system in which a mathematical operation has been performed on a plurality of numbers simultaneously may still benefit from parallelism provided that the desired value is the most probable outcome when the system is measured. An example of a quantum algorithm which operates in this way is described in "A Fast Quantum Mechanical Algorithm for Database Search" by Lov Grover, pp. 212–219, Proceedings of the $28^{th}$ Annual ACM Symposium on the Theory of Computing (Philadelphia, May 1996).

Ideally, the qubits in the quantum computer should be identical, while also being individually tuneable in energy. Several systems have been proposed which fulfil the requirements of having identical qubits which are individually controllable. For example, experimental quantum computers have been implemented using atomic beams, trapped ions and bulk nuclear magnetic resonance. Examples of these systems are described in "Quantum computers, Error-Correction and Networking: Quantum Optical approaches" by Thomas Pellizari, pp. 270–310 and "Quantum Computation with Nuclear Magnetic Resonance" by Isaac Chuang pp. 311–339 of "Introduction to Quantum Computation and Information" ibid. However, these systems are difficult to fabricate and have the added disadvantage that their architecture cannot be easily scaled-up to accommodate a large number of qubits, i.e. more than about 10 qubits.

Quantum computers may also be implemented using solid-state systems employing semiconductor nanostructures and/or Josephson junctions. One such device is described in "Coherent control of macroscopic quantum states in a single-Cooper-pair box" by Y. Nakamura, Yu. A. Pashkin and J. S. Tsai, Nature, volume 398, p 786 (1999). Another device is described in our EP application 01304745.1. The advantage of such solid state systems is that they are better suited to being scaled and so provide quantum computers of practical utility. However, in semiconductor-based systems, the qubits are individually fabricated using lithographic methods. As a result, the qubits are slightly different from one another, even though they are intended to be identical.

The present invention seeks to provide an improved quantum computer. The present invention also seeks to provide a quantum computer in which the qubits are substantially identical to one another and easy to fabricate.

SUMMARY OF THE INVENTION

According to the present invention there is provided a quantum computer having at least one qubit comprising a system which exhibits first and second eigenstates, said system being one of a plurality of substantially identical systems and a structure for moveably anchoring said system to a predetermined position.

The system may occur naturally and may comprise a molecule. The molecule may be pyramidal, such as ammonia or cyanamide.

The structure for anchoring the system to the predetermined position may comprise a cage for the system, such as an endohedral molecule. The endohedral molecule may be a buckminsterfullerene molecule, such as a $C_{60}$ molecule.

The quantum computer may comprise a substrate for anchoring the system thereto. The substrate may include an insulating region, such as silicon dioxide or silicon nitride. The substrate may further include a conducting region, comprising a semiconductor, such as silicon, and may be doped with an impurity. The impurity may be doped to a concentration of at least $1 \times 10^{18}$ cm$^{-3}$. The substrate may be patterned.

The quantum computer may include a detector for detecting a state of said system, such as an electrometer. The substrate may be patterned to define the detector.

The system may comprise a system for defining first and second delocalised states, which may have associated with them first and second dipole moments respectively. The first and second dipole moments may be electric dipole moments. The first and second delocalised states may be superpositionable so as to produce said first and second eigenstates. The first and second eigenstates may be split by an energy gap, which can be of the order of 10 $\mu$eV or greater.

The quantum computer may comprise a further structure for arranging said structure for anchoring said system to said predetermined position, which can be tubular, for example a molecular nanotube and in particular one formed of carbon.

The quantum computer may comprise another qubit which comprises another system substantially identical to said system and another structure for moveably anchoring said another system to another predetermined position. The another structure for moveably anchoring said another system to said another predetermined position may be different from said structure for moveably anchoring said system to said predetermined position.

The quantum computer may comprise a different qubit which comprises a different system which exhibits third and fourth eigenstates, said different system being one of a plurality of substantially identical systems and structure for moveably anchoring said different system to a predetermined position.

According to the present invention there is also provided apparatus including a quantum computer and a source for providing a time dependant electric field to said quantum computer. The source can generate microwaves.

According to the present invention there is also provided apparatus including a quantum computer and control circuitry for controlling said gate electrodes.

According to the present invention there is also provided apparatus including a quantum computer and a refrigerator for cooling said quantum computer.

According to the present invention there is also provided a method of operating the quantum computer comprising applying a first static electric field for causing said first and second eigenstates to resolve into first and second localised states. The method may further comprise measuring said system.

According to the present invention there is also provided a method of operating the quantum computer comprising applying a time-dependent electric field for causing said system to undergo Rabi osciallation.

According to the present invention there is also provided a method of operating the quantum computer comprising applying a second static electric field for altering an energy gap between said first and second eigenstates.

According to the present invention there is also provided a method of fabricating a quantum computer having at least one qubit, the method comprising providing a system which exhibits first and second eigenstates, said system being one of a plurality of substantially identical systems and providing a structure for moveably anchoring said system to a predetermined position.

The method may further comprise moving said system to a specific position.

BRIEF DESCRIPTION OF THE DRAWINGS

Embodiments of the present invention will now be described, by way of example, with reference to the accompanying drawings, in which:—

PREFERRED EMBODIMENTS OF THE PRESENT INVENTION

Quantum Computer 1

Figure 1:
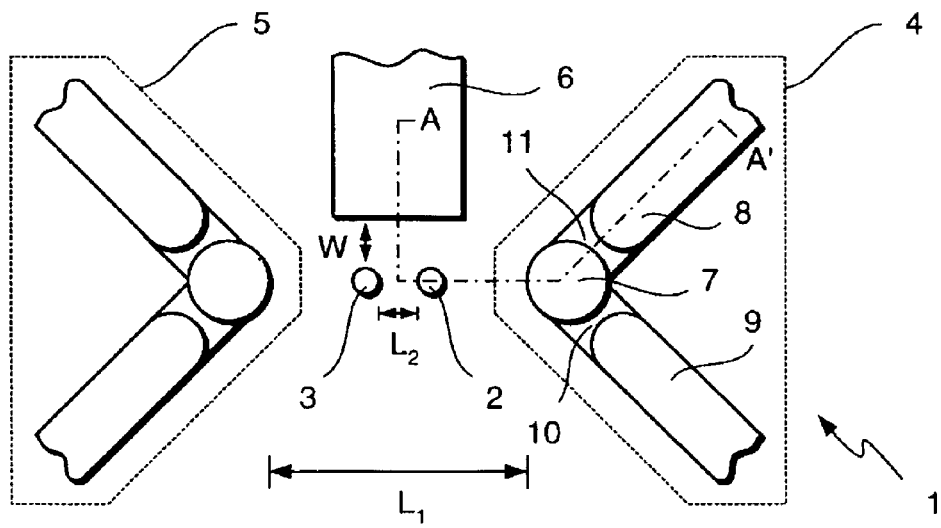
FIG. 1 is a plan view of a quantum computer according to the present invention.
Figure 2:
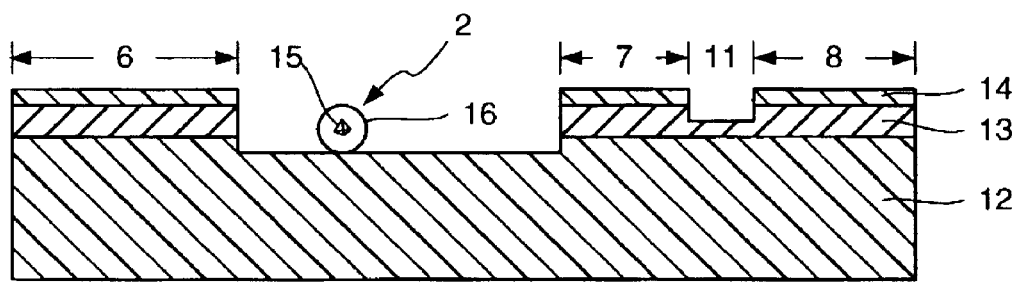
FIG. 2 is a cross-sectional view of the quantum computer shown in FIG. 1.

Referring to FIGS. 1 and 2, a quantum computer 1 comprises first and second qubits 2, 3 disposed between first and second detectors 4, 5 and a control gate 6.

The detectors 4, 5 are single-electron electrometers which employ Coulomb blockade to control current flow in dependence upon induced charge. Each electrometer 4, 5 comprises a region 7 disposed between, and isolated from, a pair of electrodes 8, 9 by corresponding etched regions 10, 11. The isolated region 7 has a diameter of about 20 nm and is separated from each electrode 8, 9 by about 10 nm. The electrometers 4, 5 are dual-purpose since, in addition to being detectors, they can also serve as additional control gates.

The electrometers 4, 5 and the control gate 6 are formed on an insulating substrate 12 in a doped semiconductor layer 13 provided with an overlying protective capping layer 14. The insulating substrate 12 comprises silicon dioxide ($SiO_2$). The doped semiconductor layer 13 comprises polycrystalline silicon (poly-Si) doped with phosphorous (P) to a concentration $n=1\times10^{20}$ cm$^{-3}$. The semiconductor layer 13 is 10 nm thick. The capping layer 14 comprises intrinsic polycrystalline silicon and is 20 nm thick. The etched regions 9, 10 comprise thinned doped semiconductor layer such that a tunnel barrier is formed between the isolated region 7 and each electrode 8, 9 with a resistance, R, greater than the quantum resistance $R_K \approx 26$ k$\Omega$.

The electrometers 4, 5 are separated by about 100 nm as indicated by an arrow $L_1$. The first and second qubits 2, 3 are separated from one another by about 10 nm as indicated by an arrow $L_2$. The control gate 6 is disposed about 50 nm from the qubits 2, 3 as indicated by an arrow W.

Figure 3:
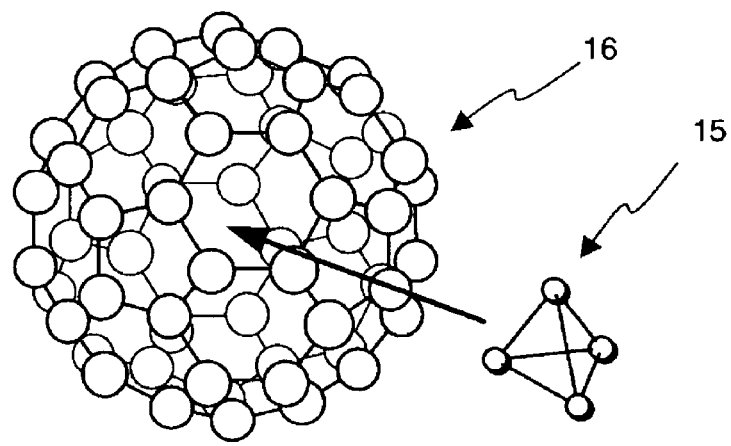
FIG. 3 shows a molecule of $NH_3$ and a molecule of $C_{60}$.

Referring to FIG. 3, each qubit 2, 3 comprises a system 15 which exhibits first and second eigenstates $|0>$, $|1>$ and means 16 for moveably anchoring said system to a predetermined position. The system 15 comprises a molecule of ammonia ($NH_3$) which is caged inside the anchoring means 16 which comprises a molecule of $C_{60}$. The ammonia molecule 15 is anchored to a position on the substrate 12 between the electrometers 4, 5, positioned using a scanning probe microscope.

The ammonia molecule 15 is the same as any other ammonia molecule. Therefore, each qubit 2, 3 has substantially the same eigenstates, unlike artificially created qubits, such as quantum dots which are formed by etching a semiconductor. Moreover, a quantum computer according to the present invention can be easily fabricated, as will be described in more detail hereinafter.

Ammonia Molecule

The ammonia molecule 15 is two-state system and hence suitable for quantum computing.

Figure 4:
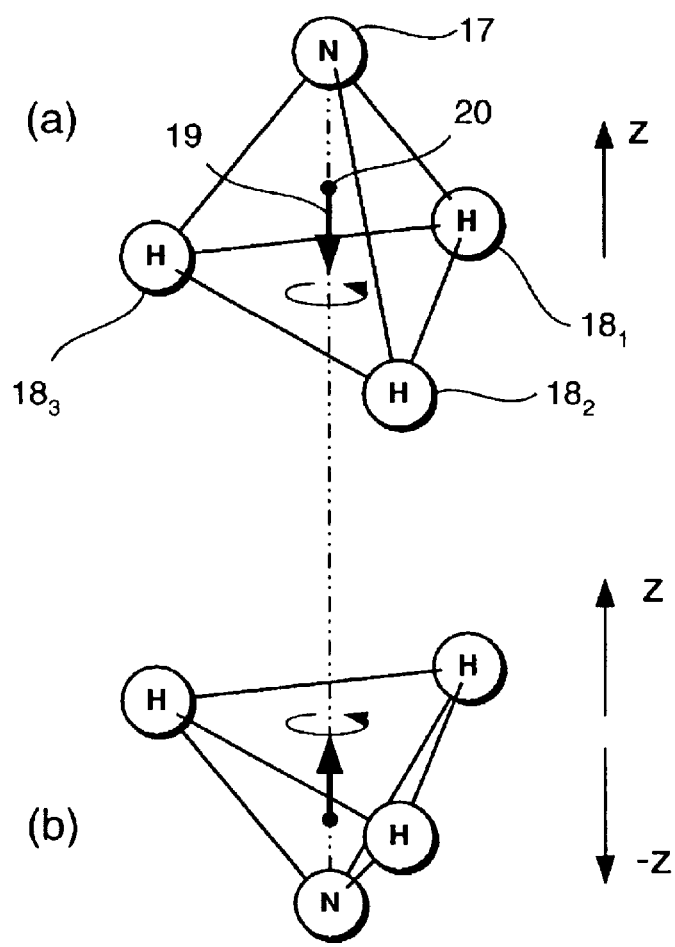
FIGS. 4a and 4b show two states of an $NH_3$ molecule.

Referring to FIGS. 4a and 4b, the ammonia molecule 15 comprises one nitrogen atom 17 and three hydrogen atoms $18_1$, $18_2$, $18_3$ arranged in a pyramidal structure. The ammonia molecule 15 has two equivalent geometrical arrangements, regardless of whether the molecule 15 is rotating, moving or vibrating. The nitrogen atom 17 can be located above the plane of the hydrogen atoms $18_1$, $18_2$, $18_3$, as shown in FIG. 4a, or below the plane of the hydrogen atoms $18_1$, $18_2$, $18_3$, as shown in FIG. 4b. Thus, the ammonia molecule 15 has two states, namely:

|nitrogen atom 17 located above the plane of the hydrogen atoms 18>

|nitrogen atom 17 located below the plane of the hydrogen atoms 18> which are hereinafter referred to as $|u>$ and $|d>$ for convenience. The nitrogen atom 17 can pass through the plane containing the hydrogen atoms $18_1$, $18_2$, $18_3$ to the other side and so flip between the $|u>$ and $|d>$ states.

The ammonia molecule 15 has an electric dipole moment, $\mu$, arising from unequal electron distribution within the N—H covalent bonds. An electric dipole vector 19 points away from the centre of mass 20 of the molecule 15, towards the nitrogen atom 17. Thus, the direction in which the dipole moment vector 19 is pointing differs for the $|u>$ and $|d>$ states. As will be described later, this property can be used to measure a state $|\psi>$ of the ammonia molecule 15.

As stated earlier, the nitrogen atom 17 can pass through the plane containing the hydrogen atoms $18_1$, $18_2$, $18_3$ to the other side, thus flipping between the $|u>$ and $|d>$ states. However, the nitrogen atom 17 is not completely free to do this.

Figure 5:
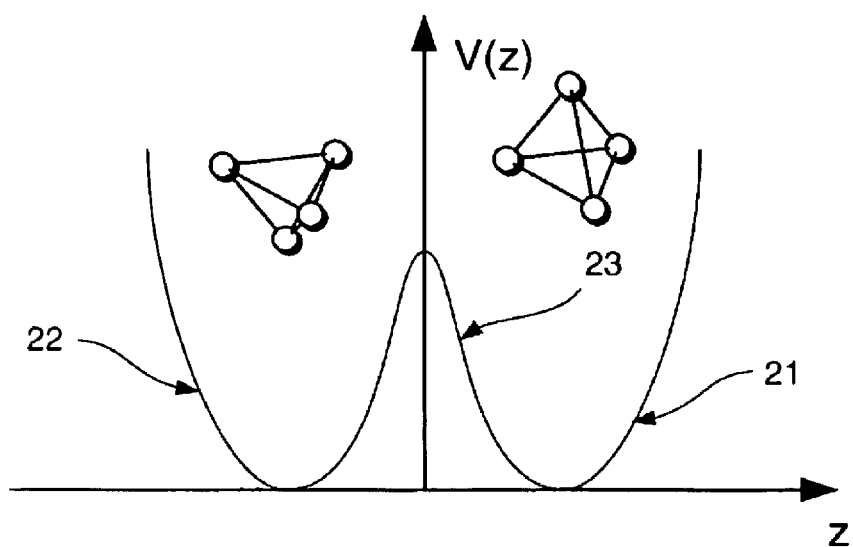
FIG. 5 is a plot of potential energy against displacement of a nitrogen atom in an $NH_3$ molecule.

Referring to FIG. 5, the $|u>$ and $|d>$ states, represented by first and second potential wells 21, 22, are separated from one another by a tunnel barrier 23, which is sometimes referred to as the inversion barrier, having a barrier height, $\Phi_{barrier}=250$ meV. Thus, to flip from one state to another, the nitrogen atom 17 tunnels through the barrier 23.

Figure 6:
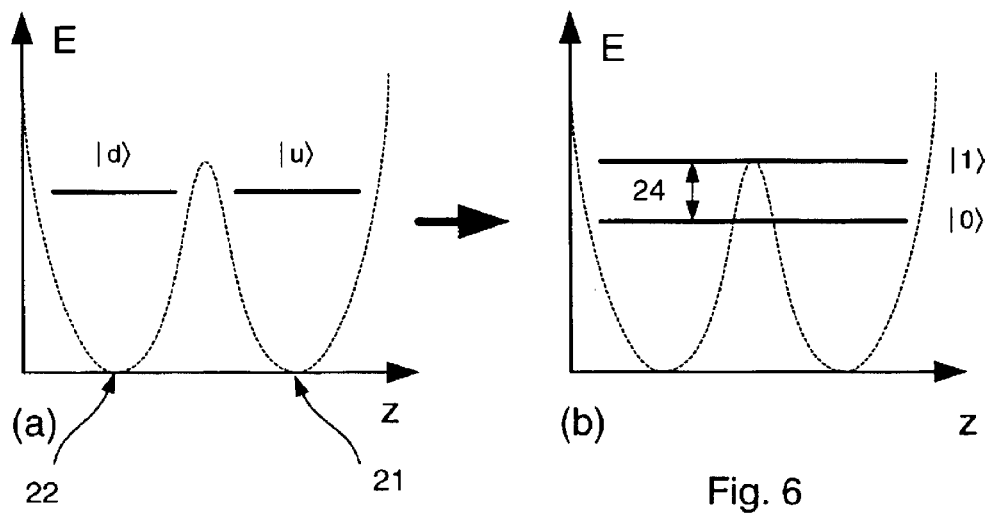
FIG. 6a is a schematic view of the energy of the two states shown in FIGS. 4a and 4b if the states are localised.
FIG. 6b is a schematic view of the energy of the two states shown in FIGS. 4a and 4b if the states are delocalised.

Referring to FIG. 6a, if the $|u>$ and $|d>$ states were separate from one another, i.e. localised to their respective potential wells 21, 22, then they would have equal energies because the states are structurally equivalent.

However, the nitrogen atom 17 is not localised. Thus, the $|u>$ and $|d>$ states are not eigenstates of the ammonia molecule 15 system. The reason for this is that a tunnelling time, $t_{tunnel}$, taken by the nitrogen atom 17 to tunnel through the barrier 21 is less than a decoherence time, $t_{dec}$, i.e. $t_{tunnel} < t_{dec}$. Consequently, the $|u>$ and $|d>$ states are delocalised. This results in superposition of the $|u>$ and $|d>$ states. A first eigenstate $|0>$ is formed as a symmetric superposition of $|u>$ and $|d>$, while a second eigenstate $|1>$ arises as an antisymmetric superposition of the $|u>$ and $|d>$ states. Thus, the eigenstates $|0>$, $|1>$ for the ammonia molecule 15 are defined as:

$$|0>=2^{-1/2}(|u>+|d>) \quad (4)$$

$$|1>=2^{-1/2}(|u>-|d>) \quad (5)$$

Referring to FIG. 6b, the energies of the first and second eigenstates $|0>$, $|1>$ are split by an energy gap 24 having a value $\Delta E_{|0> \rightleftharpoons |1>}$=98.6 µeV, wherein the first eigenstate |0> has a lower energy than the second eigenstate |1>. The first and second eigenstates |0>, |0> are often referred to as ground and excited states respectively.

At room temperature, the probability that the ammonia molecule 15 is in the first eigenstate |0> is about the same as the probability that it is in the second eigenstate |1>. At low temperatures however, for example 20 mK, the probability that the ammonia molecule 15 is in the first eigenstate |0> is unity. Therefore, cooling the quantum computer 15 to a temperature of about 20 mK and waiting for a sufficiently long time, such as a few seconds, will result in each qubit 2, 3 having a state |ψ>=|0>.

As described earlier, the ammonia molecule 15 has an electric dipole moment µ. This can be used to determine the state of the ammonia molecule 15 and also provides a means for interacting with other ammonia molecules.

The eigenstates |0>, |1> have no static dipole moment since the symmetric and antisymmetric superpositions of |u> and |d> result in zero net dipole moments.

However, the second eigenstate |1> has a non-zero dynamic dipole moment, which can be converted into a static dipole moment by applying a localising electric field, $E_{loc}$>5×10$^6$ Vm$^{-1}$.

Figure 7A:
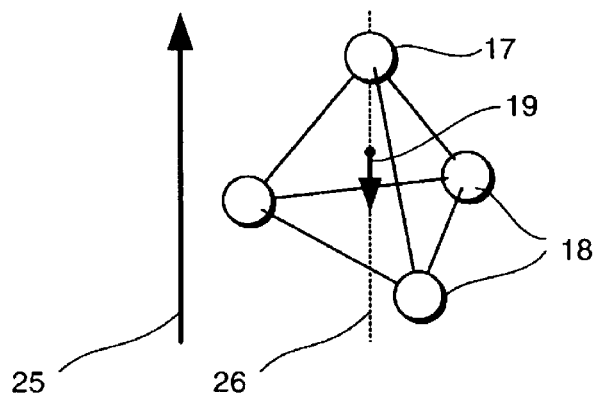
FIG. 7a shows an $NH_3$ molecule with a large applied electric field which causes localisation.
Figure 7B:
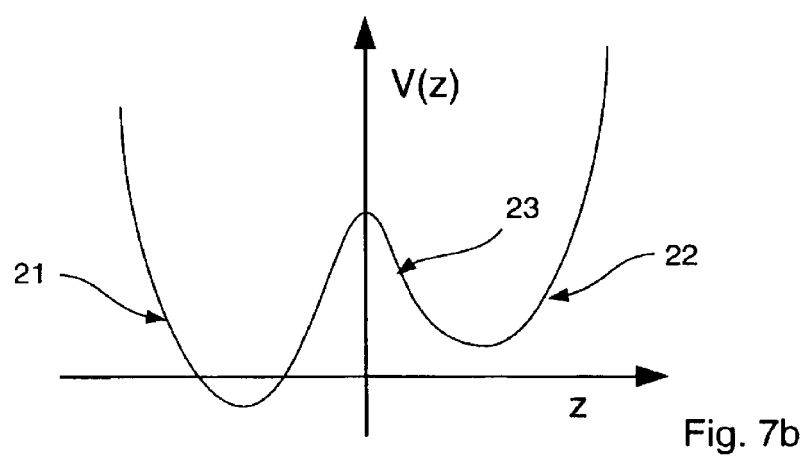
FIG. 7b is a plot of potential energy against displacement of a nitrogen atom in an $NH_3$ molecule with a large applied electric field which causes localisation.

Referring to FIGS. 7a and 7b, if the localising electric field ($E_{loc}$) 25 is applied parallel to an axis 26 in which the electric dipole moment vector 19 is oriented, the field ($E_{loc}$) tilts the potential wells 22, 23 such that |d> state has a lower potential energy than the |d> state. This causes the |u> and |d> states to become localised.

If the ammonia molecule 15 is in the first eigenstate |0>, then in an applied localising electric field ($E_{loc}$) 25 the molecule 15 will still have a zero dynamic dipole moment. If the ammonia molecule 15 is in the second eigenstate |1>, then in the localising electric field ($E_{loc}$) 25 the molecule 15 will have a non-zero dynamic dipole moment, which induces its own electric field $E_{ind}$.

Thus, a measurement of the state |ψ> of the ammonia molecule 15 is made by applying the localising electric field ($E_{loc}$) 25, such that $E_{loc}$>5×10$^6$ Vm$^{-1}$ and detecting the absence or presence of the electric field $E_{ind}$ induced by the dynamic dipole moment. In practice, the localising electric field ($E_{loc}$) 25 need not be aligned parallel to the axis 26 because a non-aligned field can be resolved into components which are parallel and perpendicular to the axis 26.

Surprisingly, the $C_{60}$ molecule 16 does not completely screen-out static and time-dependent electric fields. This is because the $C_{60}$ molecule 16 is only partially polarizable. Approximately 10% of the induced electric field $E_{ind}$ produced by the dynamic dipole moment is screened-out by the $C_{60}$ molecule 16.

Therefore, although the ammonia molecule 15 is caged within the $C_{60}$ molecule 16, it can still interact with external fields.

It will be appreciated that other systems can be used as an alternative to the ammonia molecule 15. For example, other molecules which have a pyramidal structure and which show delocalised states can be used, such as cyanamide ($NH_2CN$). Cyanamide has an inversion barrier with $\phi_{barrier}$=58 meV and an electric dipole moment 0.96 D.

Preparation, Manipulation and Measurement of a Qubit

The process by which a qubit, in the example the first qubit 2, is prepared and manipulated will now be described.

Firstly, the first qubit 2 is set-up such that |ψ>=|0>. This comprises locating the quantum computer 1 in a quiet electromagnetic environment and cooling it to about 20 mK using a dilution refrigerator.

Secondly, a unitary transformation $U_t$ of the state |ψ> is performed such that:

$$U_t|\psi\rangle = |\psi_f\rangle \quad (6)$$

where $$|\psi_f\rangle = \alpha|0\rangle + \beta|1\rangle \quad (7)$$

and where α and β are complex number coefficients.

Figure 8:
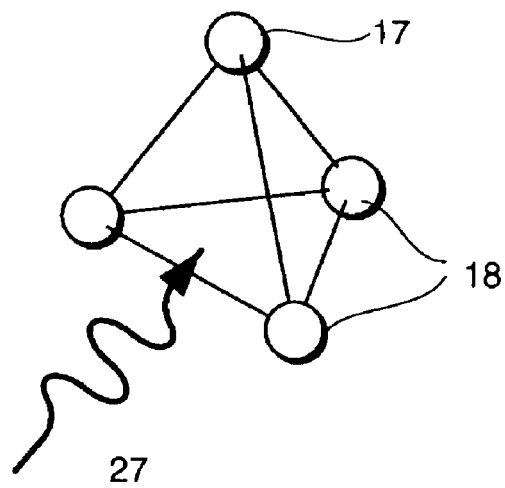
FIG. 8 shows an $NH_3$ molecule with a time-dependent electric field which causes Rabi oscillations.

Referring to FIG. 8, performing the unitary transformation $U_t$ comprises applying a time-dependent electric field 27 $E_{Rabi}(t)=E_0 \cos(\omega t)$ as a pulse of microwave radiation generated by a Gunn diode (not shown) at a resonant frequency $\upsilon=2\pi\omega$=23.8 GHz, corresponding to the energy gap 24, for a predetermined period of time T. The magnitude of the time-dependent electric field 27 is $E_0$. The ammonia molecule 15 undergoes Rabi oscillations between the first and second eigenstates |0>, |1>. The probability, P, of finding the ammonia molecule 15 in the second eigenstate |1> is given by:

$$P = |\langle 1|\Psi(t)\rangle|^2 = \sin^2\left(\frac{\mu|E_0|t}{2\hbar}\right) \quad (8)$$

where Ψ(t) is the time-dependent state of the ammonia molecule 15, µ is the electric dipole moment and ℏ is the reduced Planks constant.

Then, a measurement of the final state |ψ$_f$> is made. This comprises applying a gate bias $V_g$ to the control gate 6 so as to apply the localising electric field ($E_{loc}$) 25. The first electrometer 4 is used to measure the dynamic dipole moment of the first qubit 2.

The act of measurement will cause the final state |ψ$_f$> to project onto |0> or |1>, and return a value 0 or 1 respectively corresponding the absence or presence of a dynamic dipole moment. The probability with which these values are returned are |α|$^2$ and |β|$^2$ respectively. To determine the values of α and β, the process is repeated N-times, using the same predetermined time T. This obtains a statistical mixture of |0>$^s$ or |1>$^s$ and thus determine the effect of the transformation. If the number of measurements which return 0 is $n_0$ and the number of measurements which return 1 is $n_1$, then the transformation $U_t$ of the initial eigenstate |0> is estimated to be:

$$U_t|0\rangle = \sqrt{\frac{n_0}{N}}|0\rangle + e^{i\theta}\sqrt{\frac{n_1}{N}}|1\rangle \quad (9)$$

where $e^{i\theta}$ is a phase term.

For example, by trial and error, the skilled person can determine the period of time T needed to perform a so-called Hadamard Transformation, $U_H$, in which |0> is transformed into an equal superposition of |0> and |1>. The Hadamard Transformation is a unitary transform commonly used in quantum algorithms, such that:

$$U_H|0\rangle = 2^{-1/2}(|0\rangle + |1\rangle) \quad (10)$$

$$U_H|1\rangle = 2^{-1/2}(|0\rangle - |1\rangle) \quad (11)$$

Alternatively, the skilled person can estimate the pulse duration T using Equation 8 above by setting the probability P equal to 0.5, replacing t by T and rearranging the equation to give:

$$T = \frac{\hbar\pi}{2\mu|E_0|} \quad (12)$$

For example, if a Gunn diode is used as a microwave source, then according to Equation 12 the pulse period T needed to carry out a Hadamard Transform is about 1 ns to 100 ns.

Addressing the First and Second Qubits 2, 3 Individually

As described earlier, the state of a qubit can be prepared using a time-dependent field 27. This is provided as a pulse of microwave radiation from a Gunn diode, either directly or fed through a waveguide, directed at the substrate carrying the quantum computer 1. Clearly, the time-dependent field 27 is applied to both the first and second qubits 2, 3 and so prepares both the first and second qubits 2, 3 in the same state. This restricts the operation of the quantum computer 1. Ideally, each qubit 2, 3 should be individually addressable, such that the state of the first qubit 2 can be set independently of the second qubit 3.

A method of individually addressing the qubits 2, 3 will now be described.

Figure 9A:
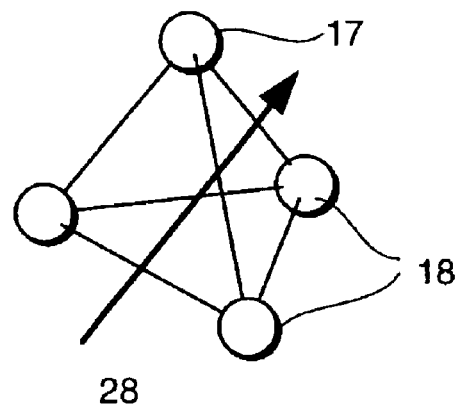
FIG. 9a shows an $NH_3$ molecule with an applied electric field which alters the energy gap between eigenstates |0> and |1> of the $NH_3$ molecule.
Figure 9B:
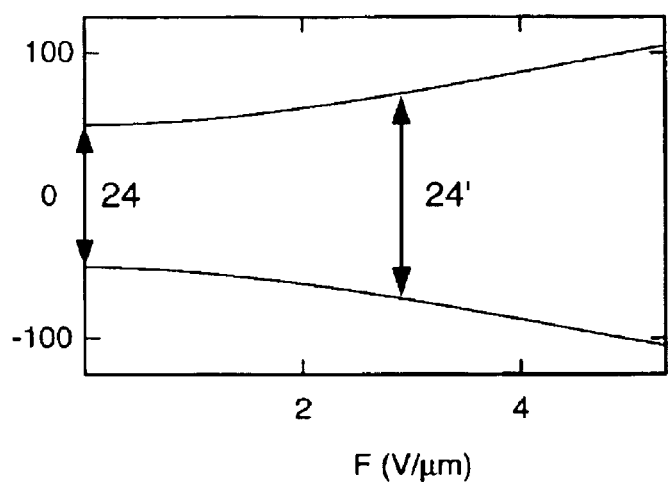
FIG. 9b is a plot of energy gap between eigenstates |0> and |1> of the $NH_3$ molecule in an applied electric field.

Referring to FIGS. 9a and 9b, the energy gap 24 can be altered by applying a static tuning electric field ($E_{tune}$) 28. If the static tuning electric field ($E_{tune}$) 28 is applied to the first qubit 2, but not the second qubit 3, then the energy gap 24 will be altered and become a modified energy gap 24'. While the tuning electric field ($E_{tune}$) 28 is applied, a global time-dependent electric field 27 is also applied at a frequency $\upsilon'$ corresponding to the modified energy gap 24'. Under these circumstances only the first qubit 2 will undergo Rabi oscillations.

Figure 10:
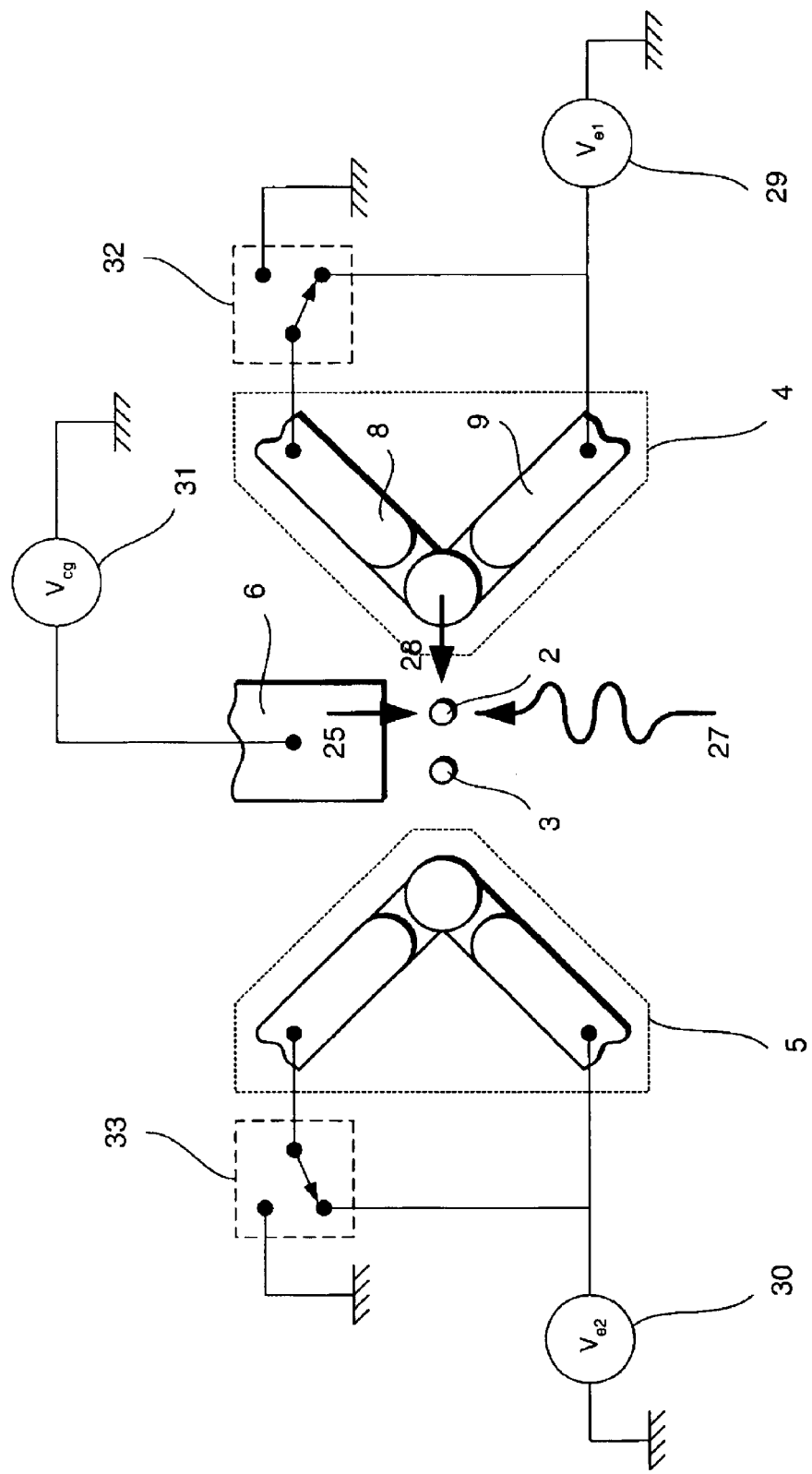
FIG. 10 is a schematic view of the quantum computer shown in FIG. 1, together with a circuit for operating the quantum computer.

Referring to FIG. 10, the quantum computer 1 is provided with first, second and third voltage sources 29, 30, 31 and first and second switches 32, 33 for switching the electrometers 3, 4 to a control gate mode.

When the electrodes 8, 9 of the first electrometer 4 are connected to the first voltage supply 29, the first electrometer operates as a control gate to apply the static tuning electric field ($E_{tune}$) 28 to the first qubit 2, thereby changing the energy gap 24 to the modified energy gap 24'. The Gunn diode (not shown) provides the time-dependent electric field 27 corresponding to the modified energy gap 24' to cause Rabi oscillations in the first qubit 2. To ensure only the first qubit 2 undergoes Rabi oscillations, it is preferred that the energy gap 24 and the modified energy gap 24' differ by at least 0.1%. This is because, typically, the Q-factor of a Gunn diode is $10^5$. According to FIG. 9b, a value of 0.34 V$\mu$m$^{-1}$ for the static tuning electric field ($E_{tune}$) 28 produces this change. Once the time-dependent field 27 pulse has finished, the static tuning electric field ($E_{tune}$) 28 is also removed.

The same result can be achieved in another way. The electrodes 8, 9 of the second electrometer 5 are connected to the second voltage supply 30. Thus, the second electrometer 5 operates as a control gate to apply the static tuning electric field ($E_{tune}$) 28 to the second qubit 3. However, the Gunn diode (not shown) provides the time-dependent electric field 27 corresponding to the unchanged energy gap 24 so as to cause Rabi oscillations in the first qubit 2.

2-qubit C-NOT Gate

The quantum computer 1 as shown in FIG. 10 can be used as a two-qubit control-NOT (CNOT) gate which performs an operation $U_{CNOT}$.

The first qubit 2 is chosen to be a target qubit T and the second qubit 3 is used as a control qubit C. If the control qubit C is in eigenstate $|1\rangle$, then the state of target qubit T is flipped, otherwise if the control qubit C is in eigenstate $|0\rangle$, then the state of the target qubit T is left unchanged. Thus, the effect of the operation $U_{CNOT}$ is:

$$U_{CNOT}|0\rangle_C|0\rangle_T = |0\rangle_C|0\rangle_T \quad (13)$$

$$U_{CNOT}|0\rangle_C|1\rangle_T = |0\rangle_C|1\rangle_T \quad (14)$$

$$U_{CNOT}|1\rangle_C|0\rangle_T = |1\rangle_C|1\rangle_T \quad (15)$$

$$U_{CNOT}|1\rangle_C|1\rangle_T = |1\rangle_C|0\rangle_T \quad (16)$$

The state of the control qubit C does not change when performing the $U_{CNOT}$ operation.

A method of performing a CNOT transformation will now be described.

Firstly, the first and second qubits 2, 3 are arranged such that $|\psi\rangle_C = |\psi\rangle_T 32 |0\rangle$. This comprises placing the quantum computer 1 in a quiet electromagnetic environment and cooling it to 20 mK. If the quantum computer 1 is already in this environment and has already performed an operation, then the quantum computer 1 is left for a sufficiently long time to allow the first and second qubits 2, 3 to fall into the ground state.

The first and second qubits 2, 3 are then prepared in initial states, namely $|\psi_1\rangle_T$ and $|\psi_1\rangle_C$ respectively.

To prepare the first (Target) qubit 2, the first voltage source 29 applies a bias to the electrodes 8, 9 of the first electrometer 4, so as to apply the static tuning electric field ($E_{tune}$) 28 to the first qubit 2. Consequently, the energy gap 24 is altered to the modified energy gap 24' from $\Delta E$ to a value $\Delta E_A$. The Gunn diode (not shown) applies a time-dependent electric field 27 at frequency $\upsilon_A$ corresponding to the modified energy gap 24' having a value $\Delta E_A$ for a period $T_A$. The first voltage source 29 then removes the applied bias. The first qubit 2 is now in the initial state $|\psi_1\rangle_T$.

To prepare the second (Control) qubit 3, the second voltage source 30 applies a bias to the electrodes 8, 9 of the second electrometer 5, so as to apply the static tuning electric field ($E_{tune}$) 28 to the second qubit 3. Consequently, the energy gap 24 is altered to the modified energy gap 24' from $\Delta E$ to a value $\Delta E_B$. The Gunn diode (not shown) applies a time-dependent electric field 27 at frequency $\upsilon_B$ corresponding to the modified energy gap 24' having a value $\Delta E_B$ for a period $T_B$. The second voltage source 30 removes the applied bias. The second qubit 3 is now in the initial state $|\psi_1\rangle_C$.

To perform the C-NOT gate operation the Gunn diode (not shown) applies the time-dependent electric field 27 at frequency $\upsilon_{CNOT}$ for a period $T_{CNOT}$. The choice of frequency $\upsilon_{CNOT}$ will be described in detail later.

Finally, the first and second qubits 2, 3 are measured. The third voltage source 31 applies a bias to the control gate 6 so as to apply the localising electric field ($E_{loc}$) 25 to the first and second qubits 2, 3. The electrometers 4, 5, measure the dipole moments of the first and second qubits 2, 3.

Figure 11:
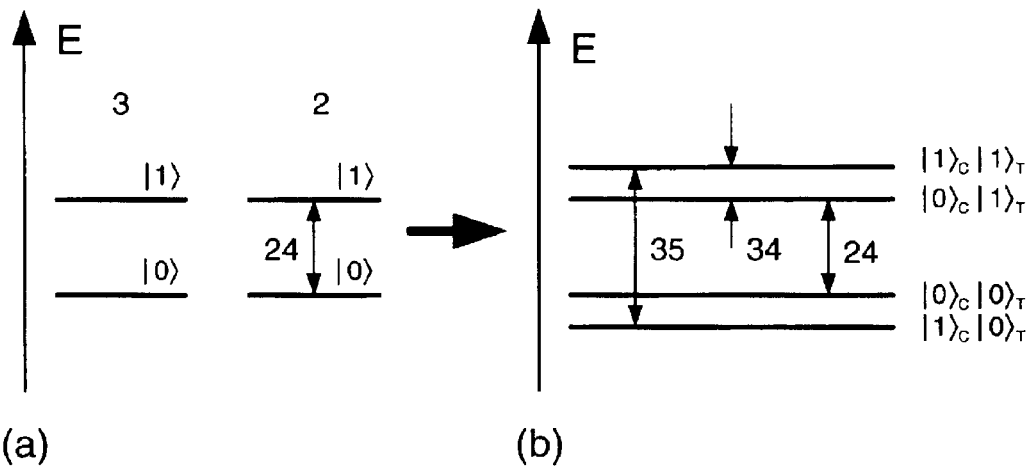
FIG. 11a is a schematic view of energies of eiegenstates |0> and |1> of first and second qubits of the quantum computer shown in FIG. 1 if isolated from one another.
FIG. 11b is a schematic view of energies of eigenstates |0> and |1> of interacting first and second qubits of the quantum computer shown in FIG. 1.

Referring to FIGS. 11a and 11b, the CNOT operation is understood as follows. The first and second qubits 2, 3 are configured sufficiently close that their respective electric dipole moments $\mu$ interact. This causes the energy levels of the first (Target) qubit 2 to split into four states, namely $|1\rangle_C|0\rangle_T$, $|0\rangle_C|0\rangle_T$, $|0\rangle_C|1\rangle_T$ and $|1\rangle_C|1\rangle_T$ by a splitting energy 34, as shown in FIG. 11b.

Figure 12:
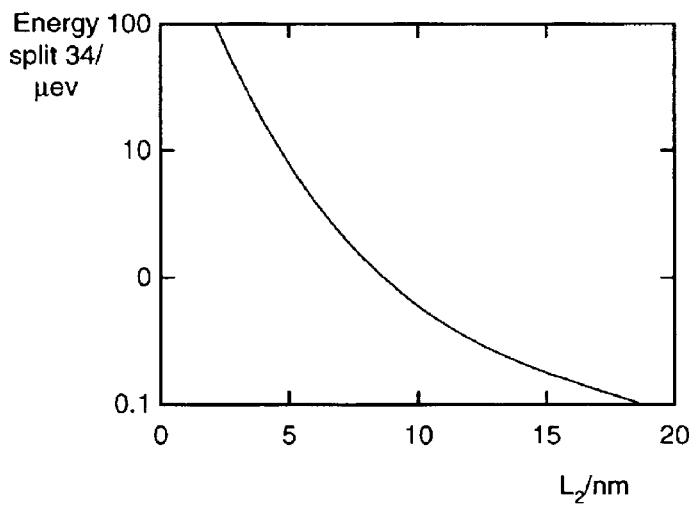
FIG. 12 is a plot of energy level splitting of an eigenstate as a function of distance between two qubits.

Referring to FIG. 12, the degree of energy splitting 34 depends upon how far apart the first and second qubits 2, 3 are separated.

The time-dependent electric field 27 applied at frequency $\upsilon_{CNOT}$ is tuned to the energy gap 35 between $|1\rangle_C|0\rangle_T$ and $|1\rangle_C|1\rangle_T$. The period $T_{CNOT}$ is chosen to effect a transformation corresponding to a $\pi$ rotation in Hilbert space. This can be calculated using Equation 8 by setting P=1. Therefore, provided the second (Control) qubit 3 is set to $|1\rangle$, if the first (Target) qubit 2 is in the eigenstate $|0\rangle$, then it is transformed to $|1\rangle$ and vice versa.

It will be appreciated that any unitary transform U can be synthesised using the $U_H$ and $U_{CNOT}$ operations together with arbitrary qubit rotations. A sequence of one or more unitary transforms can be used to construct a quantum algorithm. One such algorithm is Grover's Searching algorithm and is described in "Introduction to Quantum Computation and Information", pp. 166–171, ibid.

Fabrication of the Quantum Computer 1

A method of fabricating the quantum computer 1 will now be described.

Briefly stated, the process comprises forming $C_{60}$ molecules 16 which each contain a respective ammonia molecule 15, defining the electrometers 4, 5 and the control gate 6, depositing the $C_{60}$ molecules 16 on the substrate 12 and manoeuvring the $C_{60}$ molecules 16 into position using a scanning probe microscope.

There are several ways of forming $C_{60}$ molecules 16 so that they each contain a respective ammonia molecule 15.

Figure 13:
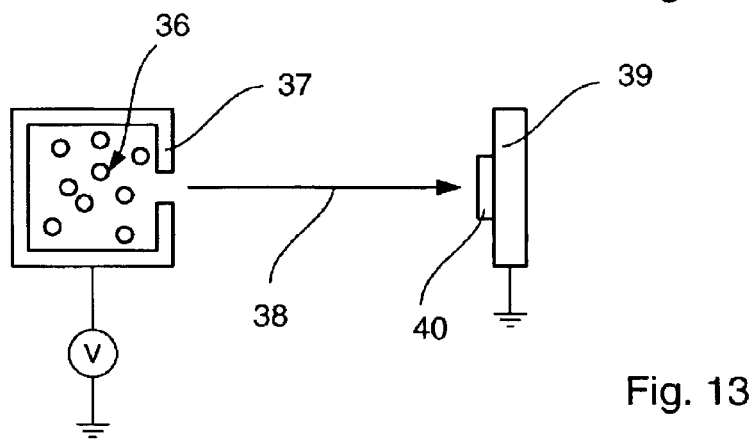
FIG. 13 shows a first apparatus for producing molecules of $C_{60}$ each having a respective molecule of $NH_3$ caged therein.

Referring to FIG. 13, in a first method, an ionised gas 36 of ammonia is produced in a chamber 37, for example using r.f. excitation. A beam 38 of ammonia ions is formed by applying a high bias, for example 40 kV, to a plate 39, relative to the chamber 37. The beam 38 may have a current of 40 $\mu$A. The beam 38 is directed at a sample 40 containing $C_{60}$ molecules and ammonia ions become injected inside the $C_{60}$ molecules. The sample 40 is then chemically purified to remove any damaged $C_{60}$ molecules.

A variant of the first process is to ion implant nitrogen into the $C_{60}$ molecules and expose the nitrogen-containing $C_{60}$ molecules to hydrogen.

Figure 14:
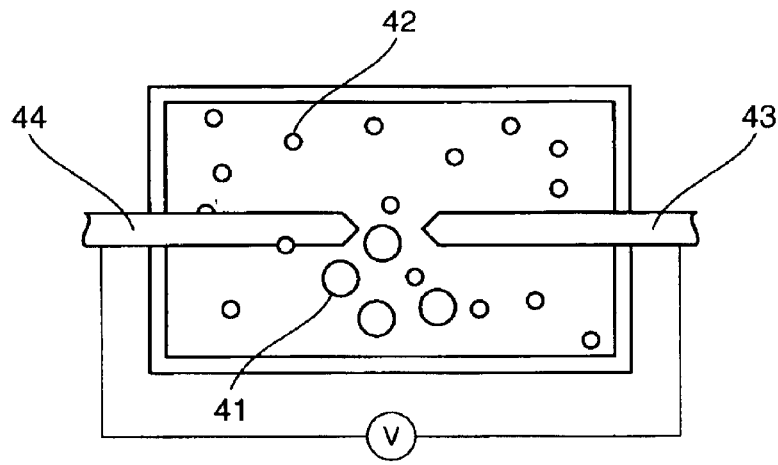
FIG. 14 shows a second apparatus for producing molecules of $C_{60}$ each having a respective molecule of $NH_3$ caged therein.

Referring to FIG. 14, in a second method, buckminsterfullerene molecules 41 are formed in an ammonia atmosphere 42 using a pair of graphite electrodes 43, 44. The buckminsterfullerene molecules 41 include $C_{60}$ molecules which are removed by filtering, for example by high-pressure liquid chromatography using activated charcoal and silica-gel.

The $C_{60}$ molecules 16 which each contain a respective ammonia molecule 15 are dissolved in a solvent, such as toluene.

Figure 15:
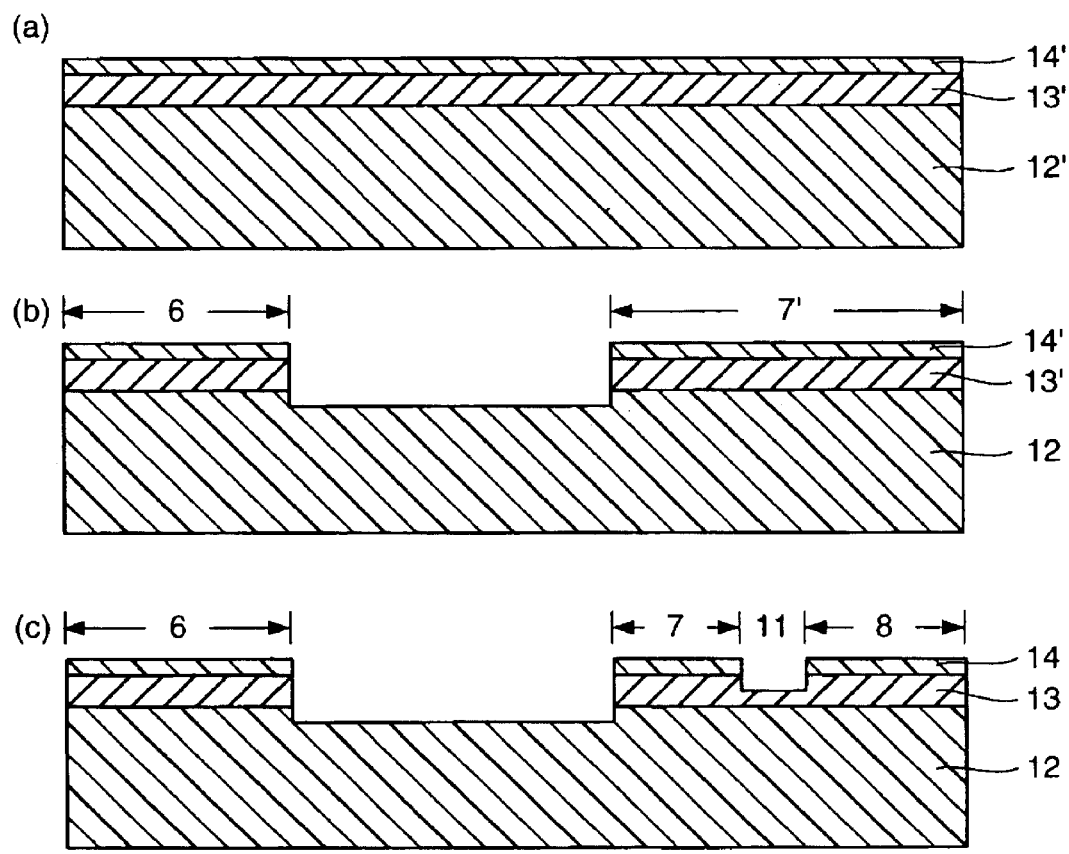
FIGS. 15a to 15g show a method of manufacturing the quantum computer shown in FIG. 1.
Figure 15:
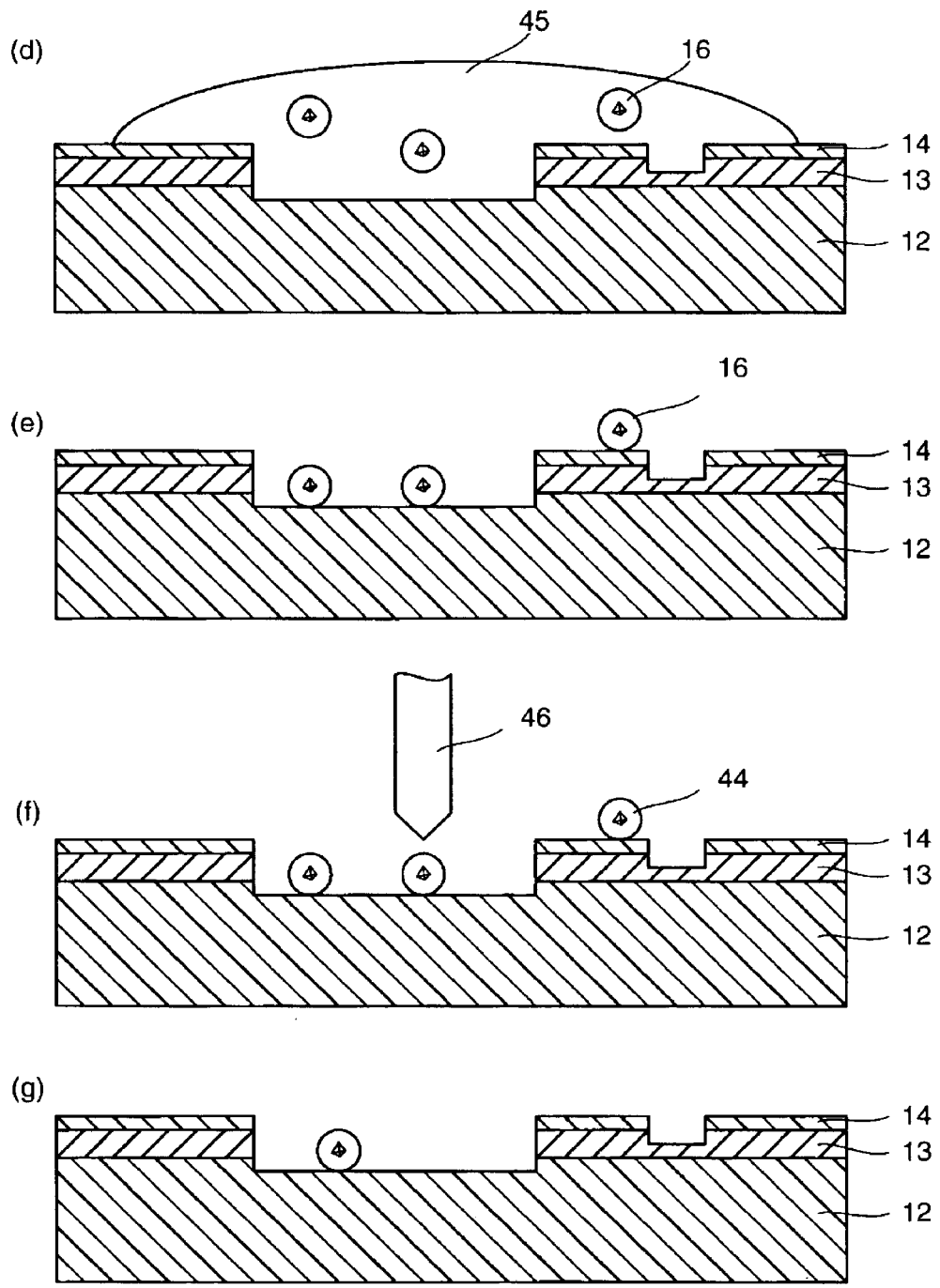

Referring to FIG. 15a, a silicon dioxide substrate 12' is provided on which a layer of n-type doped polycrystalline silicon (poly-Si) 13' is deposited using low-pressure chemical vapour deposition (LPCVD) at 770° C. and 1000 mTorr using silane ($SiH_4$), hydrogen ($H_2$) and phosphine ($PH_3$) as feed gases. A capping layer of intrinsic polycrystalline silicon 14' is deposited using LPCVD using silane ($SiH_4$) and hydrogen ($H_2$).

The polycrystalline silicon layer 13' doped is doped with phosphorous (P) to a concentration $n=1 \times 10^{20}$ cm$^{-3}$ and is 10 nm thick. The intrinsic polycrystalline silicon 14' is 20 nm thick.

The silicon dioxide substrate 12' and overlying silicon layers 13', 14' are patterned using optical lithography and dry etched using reactive ion etching (RIE) to define an active region (not shown). A mixture of $CF_4/O_2$ is used to etch silicon and $CHF_3$ is employed to etch into the silicon dioxide substrate 12'. Aluminium is sputtered onto the silicon dioxide substrate 12' and is patterned using optical lithography and etched using $BCl_3/Cl_2$ RIE to define contact regions (not shown). The silicon dioxide substrate 12' and overlying silicon layers 13', 14' are patterned using electron-beam lithography and dry etching using RIE to define channels 7' 8' for the electrometer 4, 5 and the control gate 6. The corresponding structure is shown in FIG. 15b.

The isolated region 7 and the etched region 11 are defined using electron-beam lithography and RIE. The corresponding layer structure is shown in FIG. 15c.

Referring to FIG. 15d, solvent 45 in which is dissolved the ammonia-bearing $C_{60}$ molecules is applied to the patterned substrate 12 and silicon layers 13, 14.

Referring to FIG. 15e, the solvent 45 is allowed to evaporate, thus leaving the ammonia-bearing $C_{60}$ molecules 16 on the patterned substrate 12 and silicon layers 13, 14. The ammonia-bearing $C_{60}$ molecules 16 adhere to the substrate by van der Waals forces. However, it will be appreciated that adhesion promoters may also be used.

Referring to FIG. 15f, a scanning probe microscope 46 is used to image the surface of the patterned substrate 12 and silicon layers 13, 14. The scanning probe microscope 46 is then used to manoeuvre the ammonia-bearing $C_{60}$ molecules 16 over the patterned substrate 12 and silicon layers 13, 14. Either $C_{60}$ molecules 16 are positioned so as to be used as qubits or they are moved away from electrometers 4, 5 where they have no influence. Typically a bias of between +4 to −4V is used for imaging and a bias of 0V for moving the $C_{60}$ molecules 16. The corresponding structure is shown in FIG. 15g and also in FIG. 1.

Cellular Automaton 47

Figure 16:
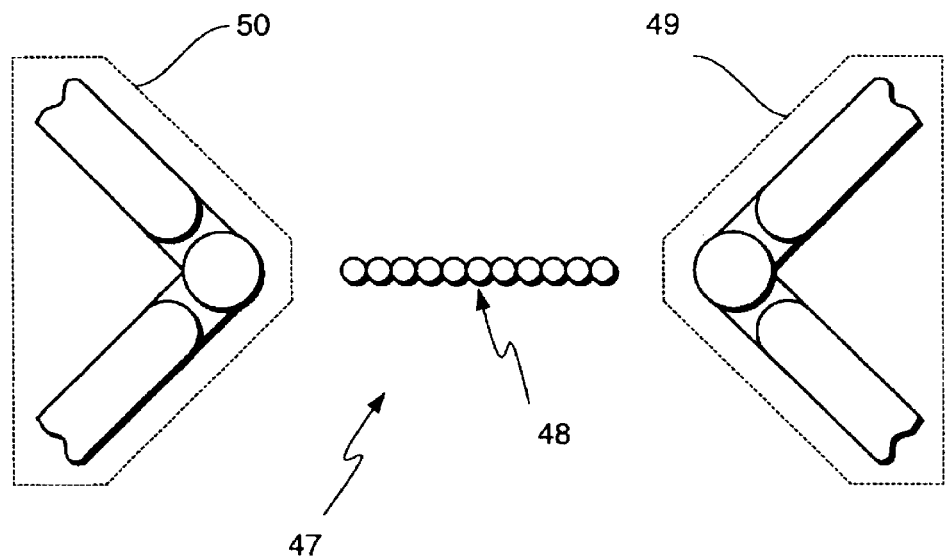
FIG. 16 is a plan view of another quantum computer according to the present invention.

Referring to FIG. 16, another quantum computer 47 is a cellular automaton based upon a scheme described in "Schemes for parallel computation without local control of qubits" by S. C. Benjamin, Physical Review A, volume 61, p 020301 (2000).

The cellular automata 47 comprises a chain 48 of cells disposed between first and second detectors 49, 50. The detectors 49, 50 are similar to those described hereinbefore with reference to the quantum computer 1.

Figure 17:
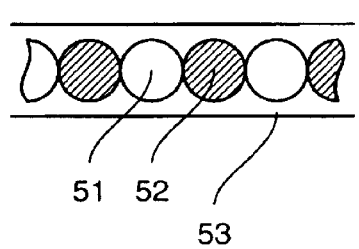
FIG. 17 is a magnified view of a chain of alternate type cells.

Referring to FIG. 17, the chain of cells 48 comprise cells 51 of a first type, hereinafter referred to as type-A cells 51, and cells 52 of a second type, hereinafter referred to as type-B cell 52, contained within a carbon nanotube 53, preferably a single-walled carbon nanotube.

The type-A cells 51 are identical to the qubits 2, 3 described earlier, however for convenience, the type-A cells 51 are described again with new reference numbers.

Figure 18A:
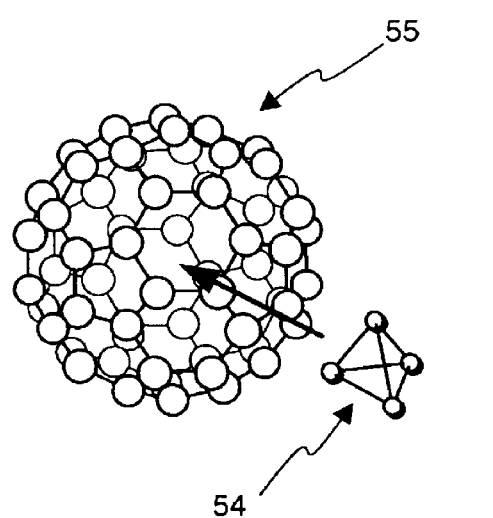
FIG. 18a shows a cell of a first type.

Therefore, referring to FIG. 18a, the type-A cells 51 each comprise a first system 54 which exhibits a first set of eigenstates $|0>_A$, $|1>_A$ and first means 55 for moveably anchoring said first system to a predetermined position. The first system 54 comprises a molecule of ammonia ($NH_3$) which is caged inside the first anchoring means 55 which comprises a molecule of $C_{60}$.

Figure 18B:
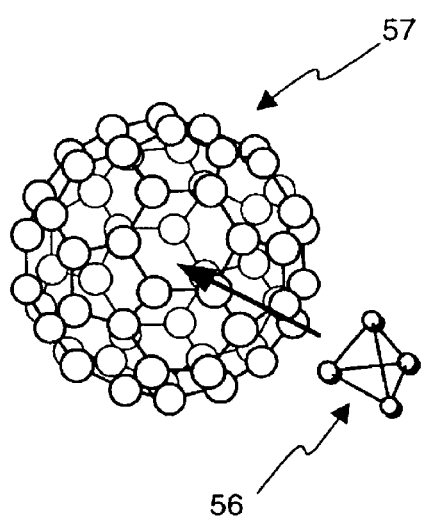
FIG. 18b shows a cell of a second type.

Referring to FIG. 18b, the type-B cells 52 each comprise a second system 56 which exhibits a second set of eigenstates $|0>_B$, $|1>_B$ and second means 57 for moveably anchoring said system to a predetermined position. The second system 56 comprises a molecule of deuterated ammonia ($ND_3$) which is caged inside the second anchoring means 57 which comprises a molecule of $C_{60}$.

Figure 19A:
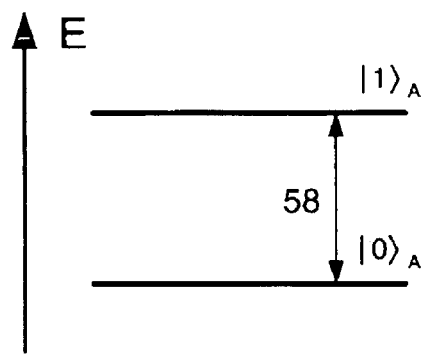
FIGS. 19a and 19b show energy gaps between eigenstates for first and second types of cell and FIG. 20 shows electric dipole moments for a cell of a first type and neighbouring cells of a second type.
Figure 19B:
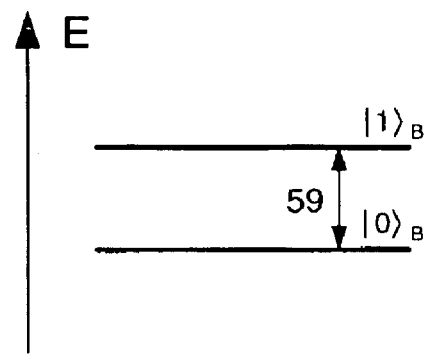

Referring to FIGS. 19a and 19b, the first set of eigenstates $|0>_A$, $|1>_A$ are split by a first energy gap 58, while the second set of eigenstates $|0>_B$, $|1>_B$ are split by a second, different energy gap 59. As will be described in more detail later, the difference between the first and second energy gaps 58, 59 is used to address type-A cells 51 independently from type-B cells and vice versa.

Figure 20:
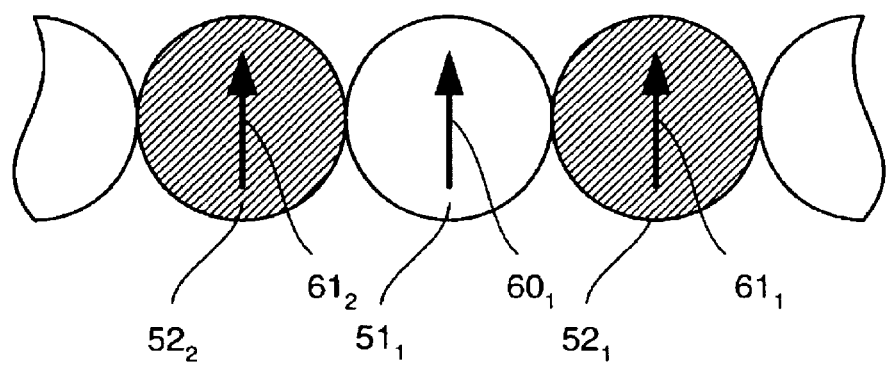

Referring to FIG. 20, a first type-A cell $51_1$ having an electric dipole moment $60_1$ interacts with neighbouring first and second type-B cells $52_1$, $52_2$ having respective dipole moments $61_1$, $61_2$ and vice versa. In this example, the type-A cell dipole moment 60 is the same as the type-B cell dipole moment 61.

Type-A cells 51 and type-B cells 52 are independently addressable, as hereinbefore described, by applying a time-dependent field ($E_{Rabi}$) having a frequency $v_A$ or $v_B$ corresponding to either the first or second energy gap 58, 59 respectively. Therefore, using an appropriate pulse period for the time-dependent field ($E_{Rabi}$), type-A cells 51 and type-B cells 52 may be operated on. However, due to an induced electric field ($E_{ind}$) arising from dipole moments $61_1$, $61_2$ of the neighbouring first and second type-B cells $52_1$, $52_2$, the first energy gap 58 may be altered. Thus, if a time dependent field ($E_{Rabi}$) having a frequency $v_A$ is applied, the first type-A cell $52_1$ may not be transformed. Moreover, cells 51, 52 at either end of the chain 48 only have one neighbour and so are individually addressable. This is used to "load" and "unload" information to and from the chain 48.

Fabrication of the Cellular Automaton 47

The cellular automaton 47 is fabricated in a similar way to the quantum computer 1.

Briefly stated, the process comprises forming $C_{60}$ molecules 55, 57 which each contain a respective ammonia molecule 54 or deuterated ammonia molecule 56 and assembling the $C_{60}$ molecules 55, 57 within the carbon nanotube 53. The process continues by defining the electrometers 49, 50, depositing the carbon nanotube 53 on the substrate 12 and manoeuvring the carbon nanotube 53 into position using a scanning probe microscope.

$C_{60}$ molecules 55, 57 are assembled within the carbon nanotube 53, for example by capillary filling, vapour phase process or diffusion. Examples of how fullerenes are placed in carbon nanotubes are given in "Discrete atom imaging of one-dimensional crystals formed within single-walled carbon nanotubes" by R. R. Meyer et al., Science, volume 289, page 1324 (2000), "Encapsulated $C_{60}$ in carbon nanotubes" by B. W. Smith et al., Nature, volume 396, page 323 (1998), "Carbon cage structures in SWNT: A new class of materials", D. E. Luzzi and B. W. Smith, Carbon 38, page 1751 (2000) and papers referred to therein.

It will be appreciated that there are other ways in which to produce different cell types with different energy gap. For example, each cell may have its own gate for applying a static tuning field ($E_{tune}$) similar to that described hereinbefore.

Furthermore, the polarizability of the $C_{60}$ molecule 55, 57 may be changed in order to change the electric field experienced by the ammonia molecule 54, 57. This is achieved by adding a chemical group exohederally to the $C_{60}$ molecule 55, 57. Alternatively, one cell type may be caged inside an anchoring means which comprises a difference buckminsterfullerene molecule, such as a molecule of $C_{70}$.

It will be appreciated that many modifications may be made to the embodiments described above.

For example, other systems can be used as an alternative to the ammonia molecule 15, such as cyanamide ($NH_2CN$) and other pyramidal molecules which have two delocalised states which result in two energy split eigenstates.

More generally, a system may be used which exhibits two eigenstates and which can interact with other systems electrically, optically or magnetically.

The system may be a chemical group forming part of a larger molecule.

For example, other anchoring means can be used, such as other fullerenes as $C_{70}$, $C_{76}$ or $C_{84}$. Chemical groups can be attached to the fullerenes.

More generally, an anchoring means may be used, which allows a two-state system which would otherwise be mobile, to be tethered or adhered to a position.

The electrometers and gates can have different arrangements. In particular the electrometers can be arranged as wires or multiple islands and be formed in different materials such as other semiconductors and metals. For example, silicon can be doped with other n-type impurities, such as arsenic, or with a p-type impurity, such as boron. Other doping concentrations can be used. The thickness of the doped semiconductor layer can be altered.

The electrometer and gates may be formed from other materials, such as other semiconductors, metals or organic structures. For example, the electrometers and gates may comprise other doped semiconductors such as gallium arsenide (GaAs) formed on a semi-insulating substrate of intrinsic GaAs or aluminium gallium arsenide (AlGaAs). Alternatively, the electrometers and gates can comprise a metal, such as aluminium.

What is claimed is:

1. A quantum computer having at least one qubit comprising:
   a system which exhibits first and second eigenstates, said system being one of a plurality of substantially identical systems; and
   a structure for moveably anchoring said system to a predetermined position,
   wherein said system comprises a molecule.

2. A quantum computer according to claim 1, wherein said system occurs naturally.

3. A quantum computer according to claim 1, wherein said system comprises a pyramidal molecule.

4. A quantum computer having at least one qubit comprising:
   a system which exhibits first and second eigenstates, said system being one of a plurality of substantially identical systems; and
   a structure for moveably anchoring said system to a predetermined position,
   wherein said system comprises a molecule of ammonia.

5. A quantum computer having at least one qubit comprising:
   a system which exhibits first and second eigenstates, said system being one of a plurality of substantially identical systems; and
   a structure for moveably anchoring said system to a predetermined position,
   wherein said system comprises a molecule of cyanamide.

6. A quantum computer according to claim 1, wherein said structure for anchoring said system to said predetermined position comprises a cage for said system.

7. A quantum computer according to claim 1, wherein said structure for anchoring said system to said predetermined position comprises an endohedral molecule for caging therein said system.

8. A quantum computer according to claim 1, wherein said structure for anchoring said system to said predetermined position comprises a buckminsterfullerene molecule for caging therein said system.

9. A quantum computer according to claim 1, wherein said structure for anchoring said system to said predetermined position comprises a $C_{60}$ molecule for caging therein said system.

10. A quantum computer according to claim 1, wherein said structure for anchoring said system to said predetermined position is one of a plurality of substantially identical anchoring structures.

11. A quantum computer having at least one qubit comprising:
    a system which exhibits first and second eigenstates, said system being one of a plurality of substantially identical systems;

a structure for moveably anchoring said system to a predetermined position; and a substrate for anchoring thereto said system.

12. A quantum computer according to claim 11, wherein said substrate includes an insulating region.

13. A quantum computer according to claim 12, wherein said insulating region comprises silicon dioxide.

14. A quantum computer according to claim 13, wherein said insulating region comprises silicon nitride.

15. A quantum computer according to claim 11, including a conducting region.

16. A quantum computer according to claim 15, wherein said conducting region comprises a semiconductor.

17. A quantum computer according to claim 16, wherein said semiconductor comprises silicon.

18. A quantum computer according to claim 16, wherein said semiconductor is doped with an impurity.

19. A quantum computer according to claim 18, wherein said impurity has a concentration in said semiconductor of at least $1 \times 10^{18}$ cm$^{-3}$.

20. A quantum computer according to claim 11, wherein said substrate is patterned.

21. A quantum computer according to claim 20, wherein said substrate is patterned so as to define a detector for detecting the state of the system.

22. A quantum computer according to claim 1, comprising a detector for detecting a state of said system.

23. A quantum computer according to claim 22, wherein said detector comprises an electrometer.

24. A quantum computer having at least one qubit comprising:

a system which exhibits first and second eigenstates, said system being one of a plurality of substantially identical systems; and a structure for moveably anchoring said system to a predetermined position, wherein said system comprises a system for defining first and second delocalised states.

25. A quantum computer according to claim 24, wherein, said first and second delocalised states having associated with them first and second dipole moments respectively.

26. A quantum computer according to claim 25, wherein said first and second dipole moments are electric dipole moments.

27. A quantum computer according to claim 24, wherein said first and second delocalised states are superpositionable so as to produce said first and second eigenstates.

28. A quantum computer according claim 1, wherein said first and second eigenstates are split by an energy gap.

29. A quantum computer according to claim 28, wherein said energy gap is of the order of 10 $\mu$eV or greater.

30. A quantum computer according to claim 1, further comprising a further structure for arranging said structure for anchoring said system to said predetermined position.

31. A quantum computer according to claim 30, wherein said further structure is tubular.

32. A quantum computer according to claim 31, wherein said further structure comprises a molecular nanotube.

33. A quantum computer according to claim 32, wherein said molecular nanotube is formed of carbon.

34. A quantum computer according to claim 1 comprising another qubit which comprises:

another system substantially identical to said system and another structure for moveably anchoring said another system to another predetermined position.

35. A quantum computer according to claim 34, wherein said another structure for moveably anchoring said another system to said another predetermined position is different from said structure for moveably anchoring said system to said predetermined position.

36. A quantum computer according to claim 1 comprising a different qubit which comprises:

a different system which exhibits third and fourth eigenstates, said different system being one of a plurality of substantially identical systems and a structure for moveably anchoring said different system to a predetermined position.

37. Apparatus including a quantum computer according to claim 1 and a source for providing a time dependant electric field to said quantum computer.

38. Apparatus according to claim 37, wherein said source generates microwaves.

39. Apparatus including a quantum computer according to claim 1, further comprising gate electrodes for altering an energy gap between said first and second eigenstates and control circuitry for controlling said gate electrodes.

40. Apparatus including a quantum computer according to claim 1 and a refrigerator for cooling said quantum computer.

41. A method of operating a quantum computer having at least one qubit comprising:

exhibiting first and second eigenstates in a system, said system being one of a plurality of substantially identical systems;

moveably anchoring said system to a predetermined position using a structure;

applying a first static electric field for causing said first and second eigenstates to resolve into first and second localized states; and applying a time-dependent electric field for causing said system to undergo Rabi oscillation.

42. A method according to claim 41, further comprising measuring said system.

43. A method of operating said quantum computer claim 41 comprising applying a second static electric field for altering an energy gap between said first and second eigenstates.

44. A method of fabricating a quantum computer having at least one qubit, the method comprising:

providing a system which exhibits first and second eigenstates, said system being one of a plurality of substantially identical systems;

providing a structure for moveably anchoring said system to a predetermined position; and applying a time-dependent electric field for causing said system to undergo Rabi oscillation.

45. A method according to claim 44 further comprising moving said system to a specific position.

* * * * *